United States Patent [19]

Diery et al.

[11] 4,450,304
[45] May 22, 1984

[54] POLYETHER DISPERSANTS

[75] Inventors: Helmut Diery, Kelkheim; Reinhold Deubel, Bad Soden am Taunus; Joachim Weide, Kelkheim, all of Fed. Rep. of Germany

[73] Assignee: Hoechst Aktiengesellschaft, Fed. Rep. of Germany

[21] Appl. No.: 400,274

[22] Filed: Jul. 21, 1982

[30] Foreign Application Priority Data

Aug. 1, 1981 [DE] Fed. Rep. of Germany ....... 3130609

[51] Int. Cl.³ ........................................... C07C 43/205
[52] U.S. Cl. .................................... 568/609; 252/351; 106/308 Q
[58] Field of Search .................. 568/609, 608, 607

[56] References Cited

U.S. PATENT DOCUMENTS 3,004,931 10/1961 Brueschweiler et al. ...... 568/609 X
4,237,320 12/1980 Krapf et al. ....................... 568/609

FOREIGN PATENT DOCUMENTS 017189 10/1980 European Pat. Off. .
1121970 7/1968 United Kingdom ............... 568/607

*Primary Examiner*—Bernard Helfin
*Attorney, Agent, or Firm*—Connolly and Hutz

[57] ABSTRACT

Compounds of the formula

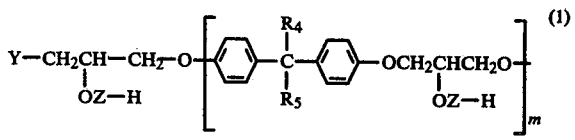

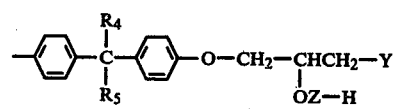

in which Y denotes an aryloxy group, which is possibly substituted, $R_4$ and $R_5$ denote hydrogen or $C_1$–$C_4$-alkyl, m denotes 0 to 12 and Z denotes polyalkylene glycol radicals having about 8 to about 200 ethylene glycol units —($CH_2$—$CH_2O$)— or up to about 200 ethylene glycol units and alkylene glycol units of the formula

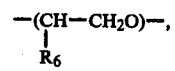

in which $R_6$ is methyl or ethyl and in which at least 8 ethylene glycol units are present. These compounds are prepared by initially reacting epoxide with a phenol or naphthol and subsequently oxalkylating. The reaction products are used as dispersants for the preparation of aqueous pigment dispersions.

2 Claims, No Drawings

POLYETHER DISPERSANTS

The invention relates to compounds of the formula 1

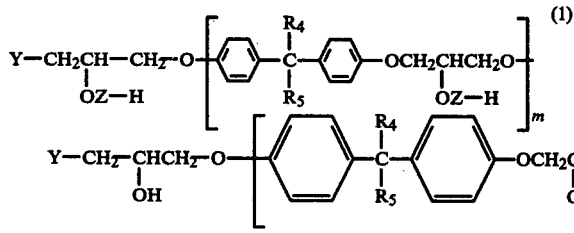

in which Y denotes a group of the formulae

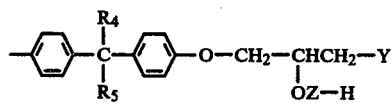

$R_1$, $R_2$, $R_3$ denote hydrogen, a $C_1$-$C_{18}$-alkyl radical, chlorine or bromine, $R_4$ and $R_5$ denote hydrogen or $C_1$-$C_4$-alkyl, m denotes 0 to 12 and Z denotes polyalkylene glycol radicals having a total of about 8 to about 200 ethylene glycol units —($CH_2$—$CH_2O$)— or up to about 200 ethylene glycol units and alkylene glycol units of the formula

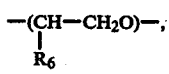

in which $R_6$ is methyl or ethyl and in which a total of at least 8 ethylene glycol units are present.

These compounds are prepared by processes which are known per se, by initially reacting a compound of the formula 2

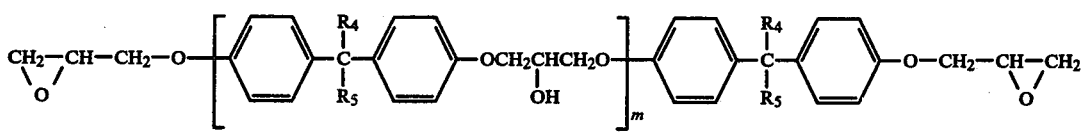

with a phenol of the formulae 3 or 4

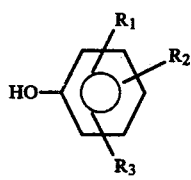

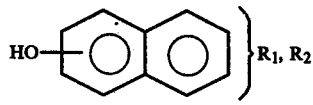

to give a compound of the formula 5

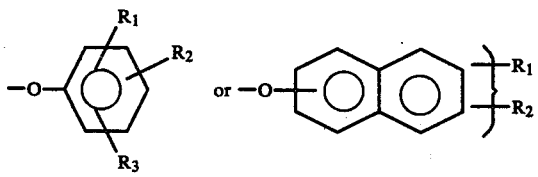

Y denoting a group of the formulae

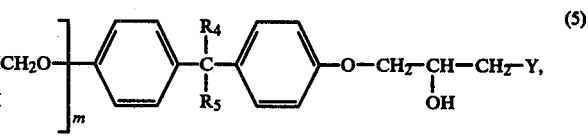

and this compound then being oxalkylated.

Suitable starting compounds of the formula 2 are the known epoxy resins, insofar as they contain terminal glycidyl ether groups, which are prepared by known methods by reaction of p,p'-dihydroxydiphenylmethane, p,p'-dihydroxydiphenylpropane or p,p'-dihydroxydiphenylbutane with epichlorohydrin. Higher epoxy resins are also suitable, such as, for example, those obtained by reaction of one of the abovementioned bisphenols with less than stoichiometric amounts of epichlorohydrin.

These epoxides are reacted with the phenolic compounds of the formulae 3 and 4 at temperatures of about 100°-160° C. However, the reaction can also be carried out in an inert organic solvent.

Examples of suitable phenolic compounds according to the formulae 3 and 4 are phenol, p-cresol, o-cresol, 2,4-xylenol, 2,4,6-trimethylphenol, p-isopropylphenol, p-tert.-butylphenol, 2,4-di-sec.-butylphenol, 2,4,6-trisec.-butylphenol, p-isooctylphenol, p-isononylphenol, o-isononylphenol, di-isononylphenol, p-isododecylphenol, p-n-dodecylphenol, p-n-octadecylphenol, o-chlorophenol, p-chlorophenol, o,o'-dichlorophenol, 2,4,6-trichlorophenol, o-bromophenol, o,o'-dibromophenol, α-naphthol, β-naphthol, 1-methyl-2-hydroxynaphthalene, 1-isooctyl-2-hydroxynaphthalene, 1-n-dodecyl-2-hydroxynaphthalene and 1-chloro-2-hydroxynaphthalene.

In this reaction, the product of the formula 5 is initially obtained which is then oxalkylated by known methods with potassium hydroxide or, preferably, with sodium hydroxide or sodium methylate as the catalyst at temperatures of about 150° to 200° C. The amount of ethylene oxide should be at least 8 moles per mole of the product of the formula 5; the amount used is such that compounds which are soluble in water result. The amount of ethylene oxide necessary for this purpose depends particularly on the hydrophobicity of the compounds of the formula 5 and the amount of propylene oxide and butylene oxide which is optionally also used and which increases the hydrophobicity.

The oxalkylation can be carried out with ethylene oxide to give products which only have polyethylene oxide chains, but it is also possible to introduce initially a polypropylene or polybutylene glycol chain with propylene oxide or butylene oxide and subsequently to introduce a polyethylene oxide radical with ethylene oxide to produce water solubility. Apart from block polymerization, in which propylene oxide or butylene oxide is initially introduced and then ethylene oxide, or vice versa, the compounds according to the invention can also be prepared in a mixed oxalkylation by oxalkylation with a mixture of ethylene oxide and propylene oxide and/or butylene oxide. In all cases, the proportion of the ethylene oxide introduced must be high enough for water-soluble products to be obtained. The oxalkylation can be carried out without increasing the pressure or in pressure vessels, it being possible for the alkylene oxide to be introduced as a liquid or in the form of a gas. The preferred working pressure is 2–8 bar.

The compounds of the formula 1 thus obtained are outstandingly suitable as dispersants for the preparation of dispersions of pigments, dyestuffs and optical brighteners, and for the formulation of agents for plant protection and pest control.

For this purpose, these compounds can be used either alone or in combination with other surfactant compounds, other additives and auxiliaries in the formulations. The anhydrous dispersants according to the invention may be diluted in any ratio with water or with mixtures of water and alcohol, and thus are particularly well suited for the preparation of highly concentrated free-flowing dispersions of organic and inorganic pigments.

The preparation of these types of pigment dispersions is carried out in a known manner by dispersing the pigments, such as, for example, azo pigments, laked azo pigments, triphenylmethane pigments, thioindigo pigments, perylenetetracarboxylic acid pigments, dioxazine pigments, quinacridone pigments, phthalocyanine pigments or inorganic pigments with the compounds according to the invention with the addition of ethylene glycol, water and, if appropriate, small amounts of other dispersants in a suitable dispersing device, such as, for example, an agitated ball mill or a divided trough kneader. The process for the preparation in the kneader is such that the dispersant according to the invention and a little water are initially placed in the kneader, the pigments are introduced in portions, optionally with the addition of small amounts of other dispersants, and the mixture of viscous consistency is kneaded. After fine dispersion is complete, dilution to the desired color intensity and consistency is carried out by the addition of, for example, ethylene glycol and water. When an agitated ball mill is used, the pigments are homogenized in a mixture of the dispersants described above, ethylene glycol and water, and possibly small amounts of other dispersants, by mixing to give a paste. This pumpable suspension is then, in general, milled in a continuously agitated ball mill with quartzite beads of about 1 mm $\phi$ until the desired fineness is obtained, possibly in several passages. Subsequently, the desired color intensity can be adjusted with water or, for example, ethylene glycol as a water-retaining agent. The ratio of dispersant to pigment powder can vary within wide limits and is generally 0.1 to 0.3 parts by weight of dispersant to one part by weight of dry pigment powder.

The pigment dispersions thus obtained are suitable for coloring emulsion paints for interior and exterior coatings, for use in textile pigment printing or for use in aqueous flexographic or gravure printing inks, particularly in combination with additions of alcohol. The outstanding wetting and dispersing properties of the dispersants described are particularly obvious from the small amounts necessary, relative to the pigment contents in the dispersions. Bright and brilliant color tones in flexographic and gravure printing are not adversely affected by the slight inherent coloration of the claimed dispersants.

EXAMPLES

Preparation of the compounds Examples 1 to 11

"ti" denotes "internal temperature" in all cases

EXAMPLE 1

216 g of p-cresol (2 moles) and 2 g of powdered sodium hydroxide were initially introduced into a 4-neck ground joint flask with reflux condenser, internal thermometer, stirrer and a dropping funnel heated to 50°. At ti=140° to 145° C., 369 g of a commercially available diglycidyl ether of 2,2-bis-[p-hydroxyphenyl]-propane (epoxide number 198, mol. mass: 369) were added dropwise within about ¾ of an hour. The reaction was exothermic. The heating bath was occasionally removed. Subsequently, the reaction mixture was stirred for 1½ hours at ti=140° C. The reaction product was a dark red-brown resinous mass having an epoxide number of 1 and a content of p-cresol of 0.4%.

244.5 g of the addition product obtained, in the presence of 2 g of powdered sodium hydroxide, were oxethylated with 805 g of ethylene oxide at 160°–170° C. in the course of 2½ hours under a pressure of 4–5 bar. The paste-like final product had a cloud point of 98° C. (in water, DIN 53,917) and contained 76.7% of ethylene oxide.

EXAMPLE 2

440 g of nonylphenol (2 moles) and 2 g of powdered sodium hydroxide were reacted with 369 g of the diglycidyl ether of 2,2-bis-[p-hydroxyphenyl]-propane as in Example 1. Time: ¼ hour; ti=140°–145° C.; subsequently stirring for ½ hour at 140° C. The reaction product was a dark red-brown resinous mass having an epoxide number of 2 and a content of nonylphenol of 1.1%.

266 g of the addition product obtained, in the presence of 1 g of powdered sodium hydroxide, were oxethylated with 1068 g of ethylene oxide at 160°–180° C. in the course of 2 hours under a pressure of 3–4 bar. The wax-like final product had a cloud point of 95° C. (in butyldiglycol according to DIN 53,917) and contained 80.1% of ethylene oxide.

EXAMPLE 3

5102 g of 2,4,6-tri-sec.-butylphenol (20 moles) (molecular weight 255.1) and 20 g of powdered sodium hydroxide were reacted with 3740 g of the diglycidyl ether of 2,2-bis-[p-hydroxyphenyl]-propane (epoxide number 195, mol. mass: 374) as in Example 1. Time: 1 hour; ti=160° C. The heating bath was removed at the start of the addition. The mixture was subsequently stirred at 160° for 5 hours. The reaction product was red-brown and resinous. The epoxide number was 1 and the content of unreacted 2,4,6-tri-sec.-butylphenol was 4.3%.

(a) 302 g of the addition product, in the presence of 5.0 g of Na methylate solution (30% strength in methanol), were oxethylated with 924 g of ethylene oxide at 160°–170° C. The final product was wax-like and contained 75.3% of ethylene oxide. Cloud point 91° C. (in butyldiglycol, according to DIN 53,917).

(b) 88 g of the addition product, in the presence of 1.5 g of Na methylate solution (30% strength in methanol), were oxethylated with 790 g of ethylene oxide as above. The final product was wax-like and contained 90.0% of ethylene oxide. Cloud point 98° C. (in butyldiglycol, in accordance with DIN 53,917).

EXAMPLE 4

376 g of phenol (4 moles) and 4 g of powdered sodium hydroxide were reacted with 748 g of a diglycidyl ether of 2,2-bis-[p-hydroxyphenyl]-propane (epoxide number 195, mol. mass: 374) as in Example 1. Time: ¾ hour; ti=140°–145° C.; subsequent stirring at 140° for 3½ hours. The reaction product was a red-brown resinous solid. The epoxide number was 2 and the content of phenol was 0.6%.

290 g of the addition product, in the presence of 1 g of powdered sodium hydroxide, were oxethylated with 1166 g of ethylene oxide at 160°–170° C. under a pressure of 4–5 bar in the course of 1½ hours. The final product was wax-like and contained 80.0% of ethylene oxide. The cloud point was 94° C. (in butyldiglycol, in accordance with DIN 53,917).

EXAMPLE 5

315.8 g of 95% pure p-tert.-butylphenol (=2 mole of 100% pure material) and 2 g of powdered sodium hydroxide were reacted with 376 g of a diglycidyl ether of 2,2-bis-[p-hydroxyphenyl]-propane (epoxide number 194; mol. mass: 376) as in Example 1. Time: ½ hour; ti=140°–145° C.; subsequent stirring at 140° C. for 2½ hours. The reaction product was a red-brown resinous solid. The epoxide number was 2 and the content of p-tert.-butylphenol was 1.5%.

145 g of the addition product, in the presence of 2.4 g of Na methylate solution (30% strength in methanol), were oxethylated with 582 g of ethylene oxide at 160°–170° C. under a pressure of 4–5 bar in the course of 1 hour. The final product was wax-like and contained 79.9% of ethylene oxide. The cloud point was 92° C. (in butyldiglycol, in accordance with DIN 53,917).

EXAMPLE 6

288 g of β-naphthol (2 moles) and 2 g of powdered sodium hydroxide were reacted with 376 g of the diglycidyl ether of 2,2-bis-[p-hydroxyphenyl]-propane (epoxide number 194; mol. mass: 376) as in Example 1. Time: ½ hour; ti=140°–145° C.; subsequent stirring at 140° C. for 2½ hours. The reaction product was a red-brown resinous solid. The epoxide number was 2 and the content of β-naphthol was 1.8%.

294 g of the addition product, in the presence of 4.9 g of Na methylate solution (30% strength in methanol), were oxethylated with 879.5 g of ethylene oxide at 160°–170° C. under a pressure of 4–5 bar in the course of 1½ hours. The final product was wax-like and contained 74.9% of ethylene oxide. The cloud point was 90° C. (in butyldiglycol, in accordance with DIN 53,917).

EXAMPLE 7

257 g of 4-chlorophenol (2 moles) and 2 g of powdered sodium hydroxide were reacted with 372 g of a diglycidyl ether of 2,2-bis-[p-hydroxyphenyl]-propane (epoxide number 196: mol. mass: 372) as in Example 1. Time: ½ hour; ti=140°–145° C.; subsequent stirring at 140° C. for 2½ hours. The reaction product was a brown-black resinous solid. The content of p-chlorophenol was 0.1%.

220 g of the addition product, in the presence of 3.4 g of Na methylate solution (30% strength in methanol), were oxethylated with 686 g of ethylene oxide at 160°–170° C. under a pressure of 4–5 bar in the course of 1 hour. The final product was wax-like and contained 75.6% of ethylene oxide. The cloud point was 90° C. (in butyldiglycol, in accordance with DIN 53,917) or 96° C. (in H₂O, in accordance with DIN 53,917).

EXAMPLE 8

244 g of 2,4-xylenol (2 moles) and 2 g of powdered sodium hydroxide were reacted with 376 g of a diglycidyl ether of 2,2-bis-[p-hydroxyphenyl]-propane (epoxide number 194; mol. mass=376) as in Example 1. Time: ½ hour; ti=140°–145° C.; subsequently stirring at 140° C. for 2½ hours. The content of 2,4-xylenol was 0.2%. The reaction product was a brown-black resinous solid.

173 g of the addition product, in the presence of 2.9 g of Na methylate solution (30% strength in methanol), were oxethylated with 731 of ethylene oxide at 160°–170° C. and under a pressure of 4–5 bar in the course of 1 hour. The final product was wax-like and contained 80.8% of ethylene oxide. The cloud point was 93.5° C. (in butyldiglycol, in accordance with DIN 53,917).

EXAMPLE 9

182.5 g of the addition product from Example 3, (tri-sec.-butylphenol and diglycidyl ether of 2,2-bis-[p-hydroxyphenyl]-propane) were oxypropylated, in the presence of 3.0 g of Na methylate solution (30% strength in methanol), with 115.4 g of propylene oxide at 160°–170° C. and under a pressure of 4–5 bar in the course of 20 minutes. Subsequently, the product was oxethylated with 362.5 g of ethylene oxide at 160°–170° C. and 4–5 bar in the course of 30 minutes. The final product was wax-like and contained 55.8% of ethylene oxide and 17.0% of propylene oxide. The cloud point was 84.5° C. (in butyldiglycol, in accordance with DIN 53,917).

EXAMPLE 10

176.8 g of the addition product from Example 3 were subjected to mixed oxalkylation, in the presence of 3.0 g of Na methylate solution (30% strength in methanol), with a mixture of 112 g of propylene oxide and 413 g of ethylene oxide at 160°–170° C. and under a pressure of 4–5 bar in the course of 50 minutes. The final product was liquid and contained 58.7% of ethylene oxide and 15.9% of propylene oxide. The cloud point was 72.5° C. (in butyldiglycol, in accordance with DIN 53,917).

EXAMPLE 11

255 g of 2,4,6-tri-sec.-butylphenol and 2 g of powdered sodium hydroxide were heated at 160° C. as in Example 1 and 468 g (0.5 mole) of a compound of the following formula

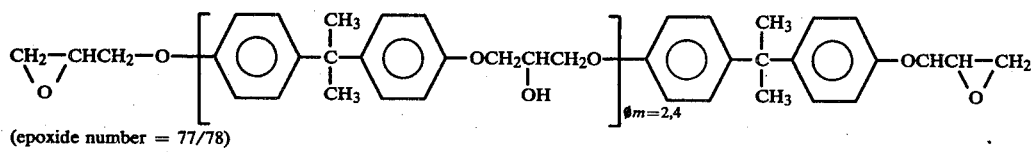

(epoxide number = 77/78)

were added in portions in 1 hour. The reaction was not exothermic. The mixture was further stirred at 160° C. for 4 hours. The red-brown homogeneous melt solidified at room temperature and had an epoxide number of 1.

150 g of the addition product, in the presence of 2.5 g of Na methylate solution (30% strength in methanol), were oxethylated with 474 g of ethylene oxide at 160°–170° C. and under a pressure of 4–5 bar in the course of 1 hour. The final product was wax-like and contained 75.8% of ethylene oxide. The cloud point was 94° C. (in butyldiglycol, in accordance with DIN 53,917).

USE EXAMPLES

Use Example 1

48 parts by weight of Pigment Red 112 (Color Index No. 12370) were dispersed with 9 parts by weight of the compound from Example 1, 10 parts by weight of ethylene glycol and 5 parts by weight of water in a divided trough kneader for 1 hour. Subsequently, the kneaded paste was diluted by the addition of 28 parts by weight of water to give a low viscosity pigment preparation of long shelf life, which was outstandingly suitable for coloring aqueous flexographic or gravure printing inks and for pigmenting aqueous paints based on plastics dispersions.

Use Example 2

When 8.5 parts by weight of the compound from Example 2 were used in Use Example 1 instead of the compound from Example 1, a pigment preparation was obtained having correspondingly good technological properties.

Use Example 3

45 parts by weight of Pigment Blue 15:3 (Color Index No. 74160) were milled with 6 parts by weight of the compound from Example 9, 10 parts by weight of ethylene glycol and 26 parts by weight of water in an agitated ball mill with 1 mm siliquartzite beads, and subsequently diluted by the addition of 13 parts by weight of water. The very free-flowing pigment dispersion obtained in this manner could be further diluted with water in any ratio and was particularly suitable for coloring water-containing binder systems.

Use Example 4

A correspondingly good pigment dispersion was obtained when the compound from Example 9 in Use Example 3 was replaced by 6 parts by weight of the compound from Example 10.

Use Example 5

42 parts by weight of a pigment black having a specific surface area of 85 m²/g by the BET method were stirred into a solution composed of 5 parts by weight of the compound from Example 3b, 10 parts by weight of ethylene glycol and 35 parts by weight of water. This suspension was milled in an agitated ball mill with 1 mm siliquartzite beads and subsequently diluted by the addition of 8 parts by weight of water. The pigment dispersion of long shelf life obtained in this way was outstandingly suitable for use in aqueous flexographic prining inks.

Use Example 6

45 parts by weight of a pigment, obtained by mixed coupling of diazotized 3,3'-dichlorobenzidine with acetoacetic anilide and acetoacetic p-anisidide in the ratio 9:1, were dispersed in a divided trough kneader for 45 minutes with 7 parts by weight of the compound from Example 6 and 13 parts by weight of water. A low viscosity pigment preparation was obtained by the addition of 10 parts by weight of ethylene glycol and 25 parts by weight of water, which pigment preparation was outstandingly suitable for coloring aqueous flexographic and gravure printing inks.

Pigment dispersions having comparably good properties were obtained when the 7 parts by weight of the compound from Example 6 were replaced by 7 parts by weight of the compound from Example 11.

Use Example 7

When 7 parts by weight of the compound from Example 5 were used in Use Example 6 instead of the compound from Example 6, a pigment dispersion was obtained having comparably good properties.

Use Example 8

40 parts by weight of Pigment 74 (Color Index No. 11741) were stirred into a solution composed of 5 parts by weight of the compound from Example 8, 10 parts by weight of ethylene glycol and 29 parts by weight of water. This suspension was milled in an agitated ball mill with 1 mm siliquartzite beads and subsequently diluted by addition of 16 parts by weight of water. The low viscosity pigment dispersion obtained in this manner had a long shelf life and was outstandingly suitable for coloring aqueous flexographic and gravure printing inks and for pigmenting aqueous paints based on plastics dispersions.

Pigment dispersions with comparably good properties were obtained when the 5 parts by weight of the compound from Example 8 were replaced by 5 parts by weight of the compound from Example 7.

Use Example 9

A pigment dispersion composed of 45 parts by weight of Pigment Yellow 98 (Color Index No. 11727), 6 parts by weight of the compound from Example 3a, 10 parts by weight of ethylene glycol and 39 parts by weight of water was prepared in accordance with Use Example 8. The properties of this pigment dispersion were comparable with those of the dispersion in Use Example 8.

Use Example 10

45 parts by weight of Pigment Red 184 were kneaded in a divided trough kneader with 5 parts by weight of the compound from Example 4, 1 part by weight of the sodium salt of a condensation product of dimethylnaphthalenesulphonic acid and formaldehyde and 20 parts by weight of water for 1 hour to give a viscous paste. After completion of dispersion, dilution was carried out by the addition of 10 parts by weight of ethylene glycol and 19 parts by weight of water to give a dispersion of long shelf life and having very good rheological properties, which was particularly suitable for coloring aqueous flexographic and gravure printing inks.

We claim:

1. A compound of the formula 1

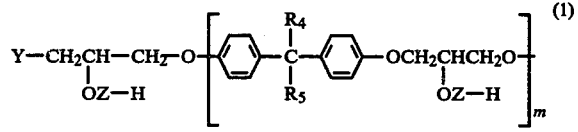

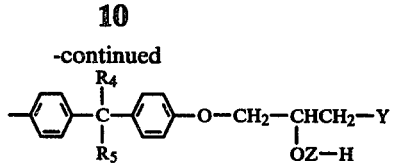

in which Y denotes a group of the formulae

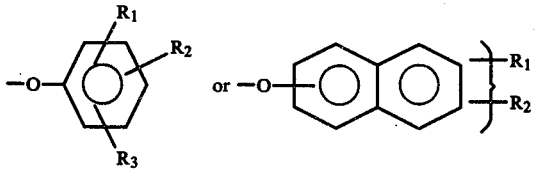

$R_1$, $R_2$, $R_3$ denote hydrogen, a $C_1$–$C_{18}$-alkyl radical, chlorine or bromine, $R_4$ and $R_5$ denote hydrogen or $C_1$–$C_4$-alkyl, m denotes 0 to 12 and Z denotes polyalkylene glycol radicals having a total of about 8 to about 200 ethylene glycol units —($CH_2$—$CH_2O$)— or up to about 200 ethylene glycol units and alkylene glycol units of the formula

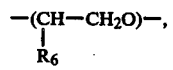

in which $R_6$ is methyl or ethyl and in which a total of at least 8 ethylene glycol units are present.

2. A compound according to claim 1, wherein $R_4$ and $R_5$ are methyl.

* * * * *